(12) United States Patent
Dube

(10) Patent No.: US 7,574,512 B2
(45) Date of Patent: Aug. 11, 2009

(54) MODBUS ENCAPSULATED TRANSPORT INTERFACE

(75) Inventor: Dennis Joseph Wilfrid Dube, Pelham, NH (US)

(73) Assignee: Schneider Automation SAS, Sophia Antipolis Cedex (FR)

( * ) Notice: Subject to any disclaimer, the term of this patent is extended or adjusted under 35 U.S.C. 154(b) by 715 days.

(21) Appl. No.: 10/709,136

(22) Filed: Apr. 15, 2004

(65) Prior Publication Data

US 2005/0256964 A1      Nov. 17, 2005

(51) Int. Cl.
*G06F 15/16* (2006.01)
*H04L 12/28* (2006.01)
*G05B 15/00* (2006.01)

(52) U.S. Cl. ............................ 709/230; 709/227; 700/1; 370/395.5

(58) Field of Classification Search ........................ None
See application file for complete search history.

(56) References Cited

U.S. PATENT DOCUMENTS

| | | | |
|---|---|---|---|
| 5,805,442 A | 9/1998 | Crater et al. | |
| 5,975,737 A | 11/1999 | Crater et al. | |
| 6,005,759 A * | 12/1999 | Hart et al. ...................... 361/66 | |
| 6,061,603 A | 5/2000 | Papadopoulos et al. | |
| 6,151,625 A | 11/2000 | Swales et al. | |
| 6,282,454 B1 | 8/2001 | Papadopoulos et al. | |
| 6,327,511 B1 * | 12/2001 | Naismith et al. ............... 700/19 | |
| 6,434,157 B1 | 8/2002 | Dube et al. | |
| 6,484,061 B2 | 11/2002 | Papadopoulos et al. | |
| 6,792,337 B2 * | 9/2004 | Blackett et al. ............. 700/295 | |
| 6,813,525 B2 * | 11/2004 | Reid et al. ..................... 700/19 | |
| 7,051,143 B2 * | 5/2006 | White et al. .................. 710/305 | |
| 7,188,003 B2 * | 3/2007 | Ransom et al. ............. 700/286 | |
| 2004/0054829 A1 | 3/2004 | White et al. | |
| 2004/0254648 A1 * | 12/2004 | Johnson et al. ................. 700/1 | |

OTHER PUBLICATIONS

Goodman, et al. "TCP/IP message encapsulation in serial protocols," MODBUS developers' community, Apr. 2003.*
ISO, "Introductory element", ISO TC 184/SC 5 N 11, Sep. 18, 2003.
Internet Engineering Task Force, "Hypertext Transfer Protocol—HTTP/1.1", RFC 2616, Jun. 1999.
"Modbus Messaging on TCP/IP Implementation Guide", web page at www.modbus.org, V1.0, May 2002.
"Modbus application protocol", web page at www.modbus.org, V1.1, Dec. 2002.
"Guide Modbus Serial Line Implementation", web page at www.modbus.org, v1.0, Nov. 2002.
"Real Time Ethernet Modbus-RTPS", IEC Publically Available Specification, 65C/xxx/NP, May, 2004.

* cited by examiner

Primary Examiner—Wen-Tai Lin

(57) ABSTRACT

A method for encapsulating HTTP messages within a MODBUS message is described in the present invention. This MODBUS message can be encoded and sent using either MODBUS/TCP or serial MODBUS. Within MODBUS, the encapsulation is built using the MODBUS Encapsulation Interface (MEI). The HTTP message may contain HTML, XML, XHTML, or SGML.

14 Claims, 3 Drawing Sheets

MODBUS ENCAPSULATED TRANSPORT INTERFACE

CROSS REFERENCE TO RELATED APPLICATIONS

This application is related to U.S. patent application Ser. No. 09/888,158, entitled "A Method, System, and Program for Transmission of Network Messages on a MODBUS Network", filed on Jun. 22, 2001, (now U.S. Pat. No. 7,051,143, issued May 23, 2006) hereby incorporated by reference.

BACKGROUND OF INVENTION

MODBUS, Profibus, Devicenet, CANOpen and Ethernet-based networks are utilized in factory automation and related fields for communicating between data processing systems and peripheral devices. Local area networks (LAN) interconnect factory equipment and other devices such as programmable logic controllers (PLC) e.g., any of the Quantum PLCs by Schneider Automation Inc., fieldbus couplers (FBC), IO modules (such as analog input, digital input, analog output, or digital output modules), motion controllers, vision controllers, invertors, encoders, process controller, numerical controllers, relays, sensors, bar code readers, weighing stations, cubing machines, power monitoring equipment, breakers, industrial power monitors, and computer work stations for monitoring and programming PLCs and other devices related to factory automation. The MODBUS protocol is widely used for factory automation applications. The MODBUS protocol is described in the MODBUS Protocol Reference Guide, publication PIMBUS-000 by Schneider Automation Inc. and is incorporated herein by reference. MODBUS Plus is a LAN protocol for industrial control applications. Applications of the MODBUS Plus protocol are described in the MODBUS Plus Network and Installation Guide, 890 USE 100 00 Version 3.0, Schneider Electric, April 1996, and is incorporated by reference.

The MODBUS protocol is well known and is described, for example, on the World Wide Web, (Web) at http://www.modbus.org, along with all related Web pages. Different networking schemes relating to factory automation are described in U.S. Pat. Nos. 6,151,625; 5,805,442; 5,251,302; and 5,699,350, and are also incorporated herein by reference.

A MODBUS frame comprises three basic parts. The first part is an address field for storing a device identifier (ID). The ID identifies the slave device to which the MODBUS frame is to be sent when the message is being sent from a master device. When the frame originates at a slave device and is to be sent to a master device, the ID identifies the slave device from which the MODBUS frame was sent. Thus, a master addresses a slave by placing the slave address in the address field of the message, and when the slave sends its response, the slave places its own address in the address field to inform the master which slave is responding. Further contained in the MODBUS frame is a function code. The function code informs the receiving device what type of function or operation will be performed by the MODBUS protocol handler at the slave device. For example, a function code, 126, causes a subsystem of devices to start or stop depending upon function code 126's subcode, i.e., 1 or 2. Yet another function code, function code 125, reads the hardware identification to the master device. The last part of the MODBUS frame includes a data field containing data pertinent to the function code in question, i.e., the Encapsulated Interface Transport message for function code 43 in the present invention.

Although MODBUS has become an industry standard, other technologies have been developed for different automation activities. MODBUS, as originally designed, was a serial communication protocol that had a limited number of nodes in a master/slave relationship. The master node is the network node issuing the MODBUS frame, while the slave node is the receiver of the MODBUS frame. In addition, MODBUS serial line frames are limited to 256 bytes in length.

In recent years, the MODBUS protocol has been adapted to operate on several other transport mechanisms. MODBUS Plus was introduced in the late 1980s to provide a higher speed interface with more flexible cabling options.

In the mid-1990s, MODBUS was again adapted to execute on Ethernet-based networks in the form of a protocol called MODBUS/TCP. This protocol provides a message packet within TCP to encapsulate the MODBUS message, allowing for communications throughout the Internet. The network speed was greatly increased, as were the cabling options. And the address space limitations were removed. Further information on the MODBUS/TCP implementation can be found at http://www.modbus.org.

Because of the compatibility between MODBUS, MODBUS Plus, and MODBUS/TCP, there are a number of advantages to encapsulating other protocols within a MODBUS message. Messages can now be transported between networks running these protocols to devices that run other protocols ("tunnelling messages"). Furthermore, messages can be sent between devices that understand MODBUS for further delivery to a processor that can understand the encapsulated message. In both scenarios, there are advantages in the interoperability that MODBUS provides.

One of the greatest advantages would be in the tunnelling of HTTP and its associated encoding mechanisms. HTTP encoded in MODBUS allows simple remote devices that may only support MODBUS or MODBUS/TCP to communicate with a remote browser.

HTTP protocols are well known in the art as a mechanism for communicating across the Internet, especially between computer processes and a web browser. HTTP communications is typically over well known TCP port 80 and is encoded using ASCII commands. For instance, a request for a web page might consist of a message from a web browser to a remote station as follows:

| HTTP Communications - Port 80 | |
| --- | --- |
| Request | GET http://controller15.company.com/home.html HTTP/1.0 |
| Response | HTTP/1.0 200 OK<br><HTML>Controller Status: RUNNING<\HTML> |

There are a number of commands and responses that are allowed in an HTTP message. To further understand HTTP, please look at the "Hypertext Transfer Protocol—HTTP/1.1", RFC 2616, specification, hereby incorporated by reference.

Within the HTTP message, data is often returned in HTML, XML, SGML, or XHTML or other similar hypertext languages. These languages are also described in detail by the W3C at www.w3c.org in the specifications for each of these protocols.

SUMMARY OF INVENTION

The invention described herein discusses a method for communicating between an automation device and a web browser that uses the steps of sending a message from the web browser to a process that encapsulates the message into a MODBUS/TCP or serial MODBUS protocol, then transmits the message to an automation device that will reply to the message using the MODBUS/TCP or serial MODBUS protocol, transmitting the message to the process that removes the encapsulation and sends the message to the web browser.

Another aspect of this invention includes a message from the web browser that uses the HTTP protocol and one of HTML, XML, XHML, or SGML.

A further aspect of this invention is a method for communicating between an automation device and a personal computer that uses the steps of sending an HTTP message to a process that encapsulates the message into a MODBUS/TCP or serial MODBUS protocol, then transmits the message to an automation device that will reply to the message using the MODBUS/TCP or serial MODBUS protocol, transmitting the message to the process that removes the encapsulation and sends the reply to the original sender.

Another aspect of this invention includes HTML, XML, XHML, or SGML in the HTTP message.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

MODBUS is a network protocol standard used in automation environments. The present invention is directed to providing a system, method and computer program for facilitating communication between nodes residing on these and other networks.

Figure 1:
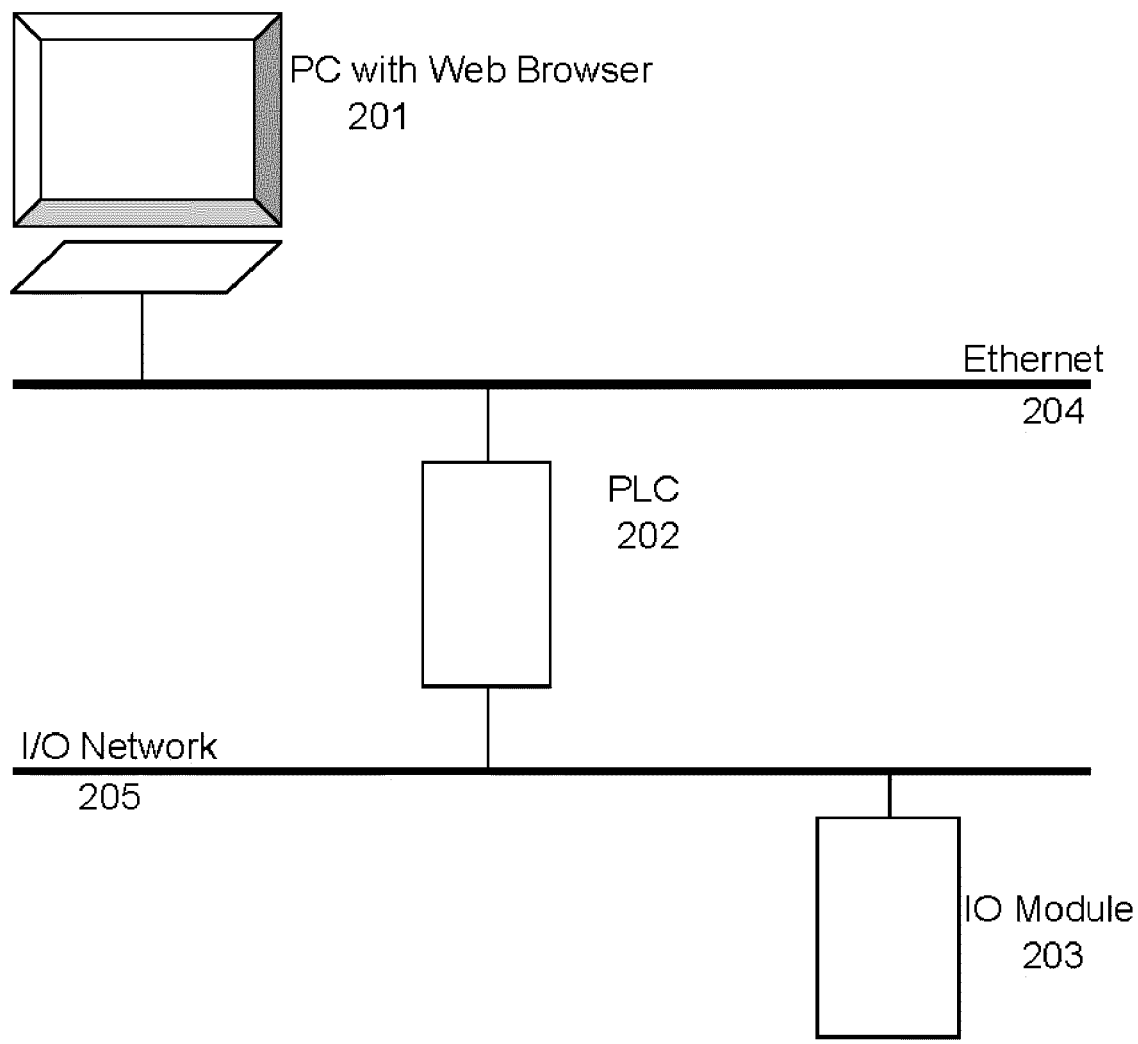
FIG. 1 is an overview of a factory automation system

FIG. 1 is an overview diagram of a factory automation system. It has been simplified to its most basic components. In a typical system, there would be many Personal Computers (PCs) 201, many Programmable Logic Controllers (PLCs) 202, and many Input/Output (IO) modules 203, with an almost limitless set of interconnections.

But for simplicity, we look at this minimum set. The Personal Computer 201 in this diagram is a typical personal computer found in any office or factory environment. It typically has a screen, keyboard, CPU, RAM, and disk drives. Often this type of computer is running a Microsoft Windows operating system, and has a standard web browser such as Netscape or Microsoft Internet Explorer. This Personal Computer 201 could also be a larger computer system or a hand held device such as a PDA, laptop, or even a cellular phone.

This Personal Computer 201 is connected to a Ethernet network 204. This network typically runs the standard Ethernet protocols of Media Access Control (MAC), Internet Protocol (IP) and the Transmission Control Protocol (TCP), as well as UDP, HTTP, MODBUS/TCP, and a large number of other protocols that run on Ethernet. This network 201 may be connected to an Intranet or to the Internet, or both.

The Programmable Logic Controller (PLC) 202 is also connected to the Ethernet network 204 and communicates in this example with the Personal Computer 201 using HTTP via a web server. The PLC 202 is also connected to the I/O network 205.

The I/O network 205 is a network used to communicate between IO Modules 203 and the PLC 202. Typically, this is a high speed dedicated real time network that is designed to facilitate deterministic communications between PLCs 202 and IO modules 203 so that control information can be reliably and predictably communicated. The protocols used on this network are MODBUS/TCP for high speed communications, although serial MODBUS could be used for low cost, low performance implementations. MODBUS Plus could also be used in some implementations.

In FIG. 1, the end device is an IO module 203, although if could be any number of other automation devices. For instance, the automation device could be a programmable logic controller, an IO head, an inverter, a breaker, a sensor, a vision device, a bar code reader, or any other device that may be found in an automation environment.

The IO module 203 is running a process that interprets MODBUS messages, including function code 43. In addition, it is operating software that operates as or emulates an HTTP server, so that the IO module 203 is able to understand the message that arrives and respond with the requested response. Such software could include a full commercial web server combined with software described in the reference code available at www.modbus.org. In another simpler implementation, the web server could be coded to inspect the arriving message for a specific URL, and then respond to that message with a fixed response that is previously stored in memory. All other URLs or messages arriving on MODBUS function code 43 would be rejected in this scenario. With this design, additional response could also be coded into the IO module 203 to respond with different URLs. Each URL would be looked up in a simple table, and the preset responses returned when that URL was received. A separate functionality could also keep the responses updated as conditions changed in the IO module 203. For instance, if the module determined that the module had an error, the software could change a string "OPERATIONAL" to "ERROR STATE" so that the error indication is returned when a particular URL is requested.

Figure 2:
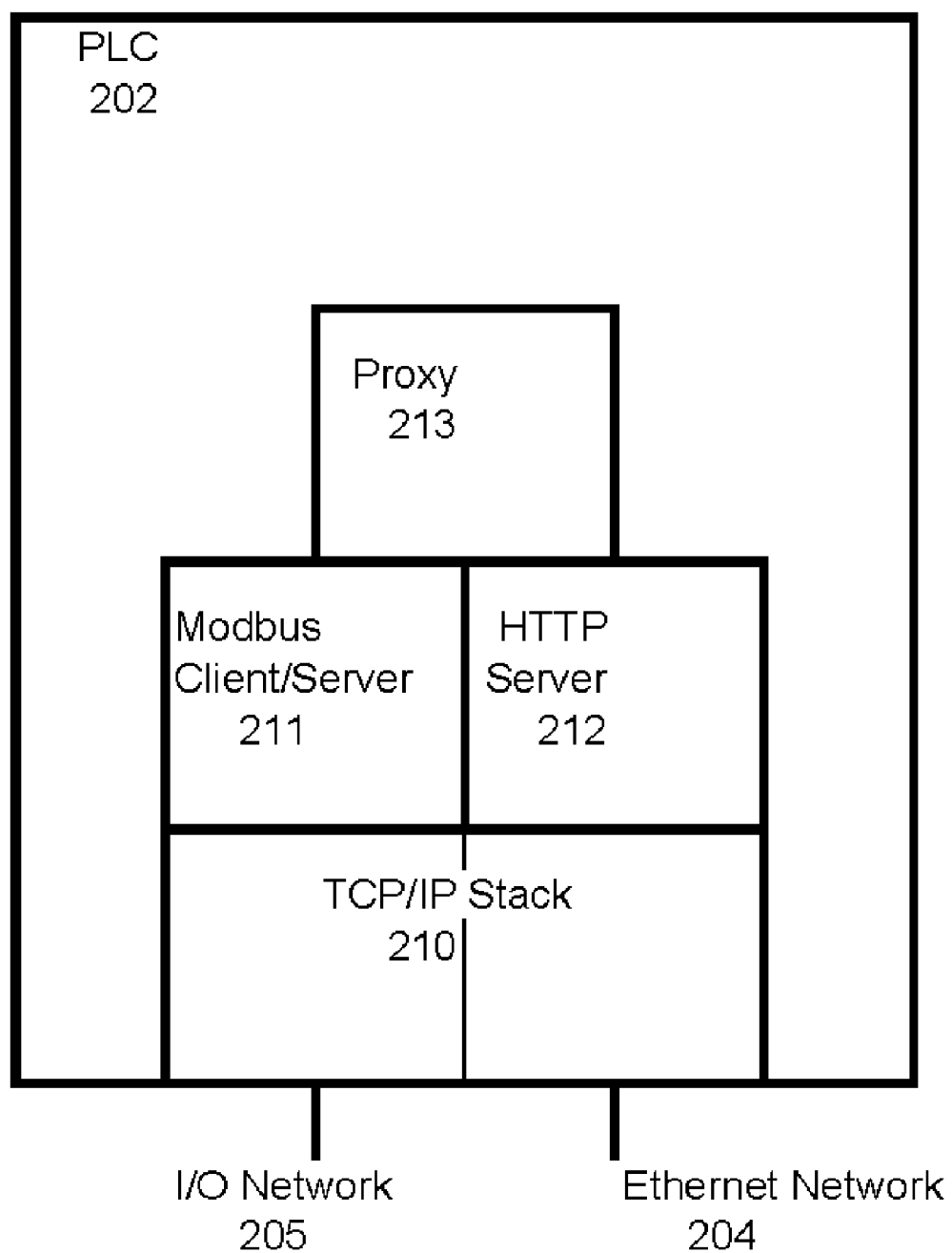
FIG. 2 is a block diagram of a set of processes within a PLC that handle the encapsulated messages

In order for the PLC 202 to bridge between the MODBUS type messages of the I/O Network 205 and the HTTP protocols that the browser in the Personal Computer 201 understands, the PLC 202 requires a set of software processes to translate the messages. A block diagram of this software is shown in FIG. 2.

Messages from a browser on the Personal Computer 201 arrive via the Ethernet network 204 at the PLC 202 and are delivered to the TCP/IP stack 210. In this example, the TCP/IP stack handles all Ethernet communications for both the Ethernet network 204 and the IO network 205.

The TCP/IP stack 210 sends the message to the HTTP Server 212 since the message is sent to TCP port 80. Port 80 is reserved for HTTP communications as part of the convention amongst the Internet community. The HTTP Server 212 examines the message and determines that it is a request for a URL that is not local to the PLC 202.

As a result, the message is sent to the Proxy 213 process. The Proxy understands through predetermined tables that this message is intended for delivery to an IO module 203 on the IO network 205. The Proxy 213 then encapsulates the HTTP request into a MODBUS message and sends the request to the MODBUS Client/Server 211. The MODBUS Client/Server 211 then sends the message out the TCP/IP stack 210 to the IO network 205.

While FIG. 1 uses a set architecture, many other architectures are envisioned. For example, in some factories where the real time characteristics are less important, the I/O network 205 and the Ethernet network 204 could be the same network. Furthermore, the PLC 202 communications functionality could be handled by another type of device such as a personal computer or a network router. Furthermore, the PLC 202 could be eliminated altogether, with the IO Module 203 communicating directly with the Personal computer 201.

The messages sent between the personal computer 210 and the PLC 202 are standard messages sent using Ethernet protocols for Media Access Control (MAC), Internet Protocol (IP), Transmission Control Protocol (TCP), Hypertext Transport Protocol (HTTP), and Hypertext Messaging Markup Language (HTML).

Figure 3:
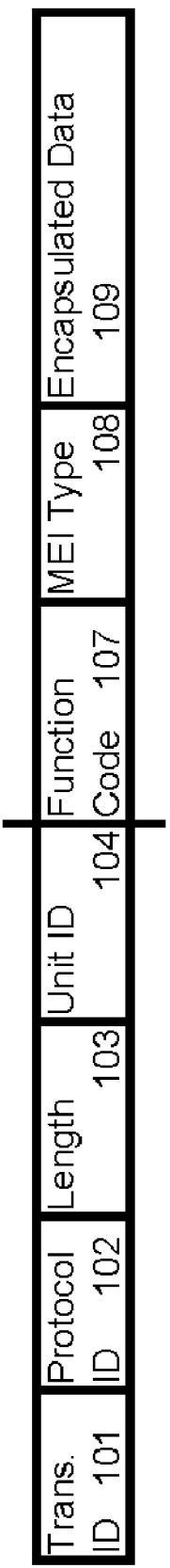
FIG. 3 is a diagram of a MODBUS/TCP message showing the encapsulated message.

The messages that are sent between the IO Module 203 and the PLC 202 are described in FIG. 3. These messages are also sent using the Ethernet protocols for Media Access Control (MAC), Internet Protocol (IP), and Transmission Control Protocol (TCP). However, they also use the MODBUS/TCP protocol, encapsulating the Hypertext Transport Protocol (HTTP) and Hypertext Messaging Markup Language (HTML) within the MODBUS/TCP message. Since both MODBUS and the HTTP protocols typically use a Master/Slave type relationship, this combination of protocols is feasible. In HTTP, a browser typically sends a message and waits for a response. MODBUS behaves in a similar manner, sending a request and waiting for a response. As a result, when an HTTP message is sent to the proxy 213 in the PLC 202, it is a simple matter to forward the message to the MODBUS client/server 211 and then wait for a response.

In FIG. 3, there is a drawing of the MODBUS/TCP message 100 that contains the encapsulated message. This message includes a Transaction ID 101 that consists of a 2 byte unsigned integer which uniquely represents a MODBUS transaction. It further consists of a 2 byte integer Protocol Identifier 102 that is always set to 0 for standard MODBUS/TCP messages. This is followed by a 2 byte Length field 103 that indicates the number of bytes to follow, including the Unit Identifier 104. The Unit Identifier 104 is a 1 byte number that identifies a remote unit on the other side of a gateway. The MODBUS PDU follows, defined as the Function Code 107, the MEI type 108 and the Encapsulated Data 109. The Function Code 107 is a 1 byte field that specifies the function of MODBUS Encapsulated Interface (MEI), and is the decimal number 43 for message containing encapsulation. The use of the number 43 is according to the standard for MODBUS, although it is anticipated that other function codes might be used in the future. The MEI type 108 is a one byte integer that specifies that the Encapsulated Data 109 contains an HTTP encoded message. The Encapsulated Data 109 is a number of bytes containing the HTTP message. The HTTP message may be in any number of languages supported by HTTP, from pure text messages, to HTTP, XML, SGML, XHTML, video or audio files.

When this package is sent over a TCP/IP network, it is sent via the reserved system port 502 in the TCP/IP stack. Port 502 is reserved for MODBUS/TCP messaging.

The handling of error conditions on a MODBUS/TCP messages 100 are well documented in the MODBUS/TCP Specifications found at www.modbus.org.

One limitation of MODBUS messaging is that the overall length of a serial line MODBUS message 100 is limited to 256 bytes. Since there is an overhead for the Address 106 and the CRC 110, then there are 253 bytes for the MODBUS PDU. The MODBUS PDU has a header that includes the Function Code 107 and the MEI type 108, leaving only 251 bytes available for use as encapsulated data 109. The MODBUS PDU structure is preserved across all MODBUS-type protocols, and is always 253 bytes with two bytes of headers. This limitation must be kept in mind when assembling HTTP messages. The path designation in a URL must be kept in a limited form so that the HTTP request is limited to 251 bytes.

Responses include web pages, and are often in excess of the 251 byte limit. However, HTTP includes a directive called chunking. This directive allows the IO Module to return information in 251 byte chunks that are reassembled by the browser on the personal computer 201. The specific details of chunking are described in the "Hypertext Transfer Protocol—HTTP/1.1", RFC 2616 specification.

Figure 4:
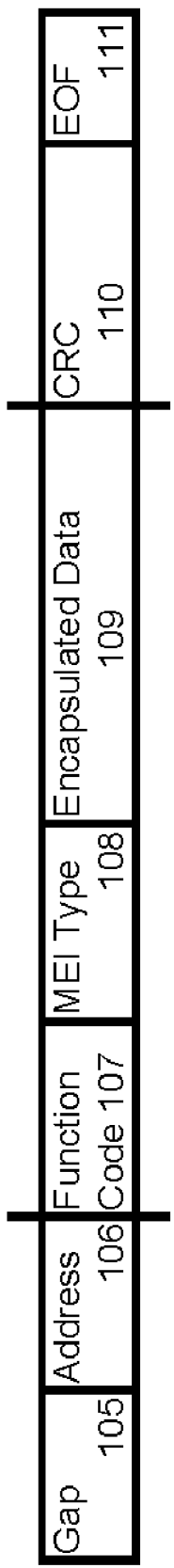
FIG. 4 is a diagram of a Serial MODBUS RTU message showing the encapsulated message.

The Serial MODBUS protocol is shown in FIG. 4. This protocol may be used as a communications mechanism in place of MODBUS/TCP for connectivity to older networks or for slower, lower cost implementations. Serial MODBUS is implemented in two different encoding schemes: ASCII and RTU. While the details of the Serial MODBUS ASCII can be found elsewhere (see www.modbus.org), MODBUS RTU is described here as an example of how encapsulation works on alternative implementations of MODBUS.

Each MODBUS RTU message 112 is proceeded by a 3 and a half character gap 105 between messages. This silence on the serial line designates the beginning of the message. A one byte address 106 follows that designates where the message is to be delivered on a daisy-chained serial network. The MODBUS PDU follows, defined as the Function Code 107, the MEI type 108 and the Encapsulated Data 109. The function type 107 is a one byte designation that the message is a MEI message, and is set to 43 decimal. The MEI type 108 follows to designate the encapsulated data 109 as HTTP. The HTTP data is in the Encapsulated Data 109 field. This is followed by a 2 byte CRC 110. This is a CRC-16 algorithm that is described in the MODBUS manual GI-MBUS-000. The CRC 110 is followed by a one byte EOF 111 designation.

Obviously, numerous modifications and variations of the present invention are possible in light of the above teachings. It is therefore to be understood that within the scope of the appended claims, the invention may be practiced otherwise than as specifically described herein.

What is claimed is:

1. A method of communicating between an end automation device having a full or emulated HTTP server and a web browser in an Ethernet environment comprising the following computer implemented steps:
   sending an HTTP request message from said web browser to a process that encapsulates said request message in a MODBUS type protocol;
   transmitting said request message to said automation device;
   responding to said request message by said automation device with a reply message using the MODBUS type protocol;
   transmitting said reply message to said process;
   reformatting said reply message such that the message is understandable by said web browser;
   sending the reformatted reply message to said web browser.

2. The method of claim 1 wherein the MODBUS type protocol is the MODBUS/TCP protocol.

3. The method of claim 1 wherein the MODBUS type protocol is the serial MODBUS protocol.

4. The method of claim 1 wherein the request message uses HTTP and HTML.

5. The method of claim 1 wherein the request message uses HTTP and XML.

6. The method of claim 1 wherein the request message uses HTTP and XHTML.

7. The method of claim 1 wherein the request message uses HTTP and SGML.

8. A method of communicating between an end automation device having a full or emulated HTTP server and a personal computer in an Ethernet environment comprising the following computer implemented steps:

sending an HTTP request message from said personal computer to a process that encapsulates said HTTP request message in a MODBUS type protocol;

transmitting said request message to said automation device;

responding to said request message by said automation device with a reply message using the MODBUS type protocol;

transmitting said reply message to said process;

reformatting said reply message such that the message is encoded in HTTP; sending the reformatted reply message to said personal computer.

9. The method of claim 8 wherein the MODBUS type protocol is the MODBUS/TCP protocol.

10. The method of claim 8 wherein the MODBUS type protocol is the serial MODBUS protocol.

11. The method of claim 8 wherein the HTTP request message uses HTML.

12. The method of claim 8 wherein the HTTP request message uses XML.

13. The method of claim 8 wherein the HTTP request message uses XHTML.

14. The method of claim 8 wherein the HTTP request message uses SGML.

* * * * *